United States Patent Office 3,427,927
Patented Feb. 18, 1969

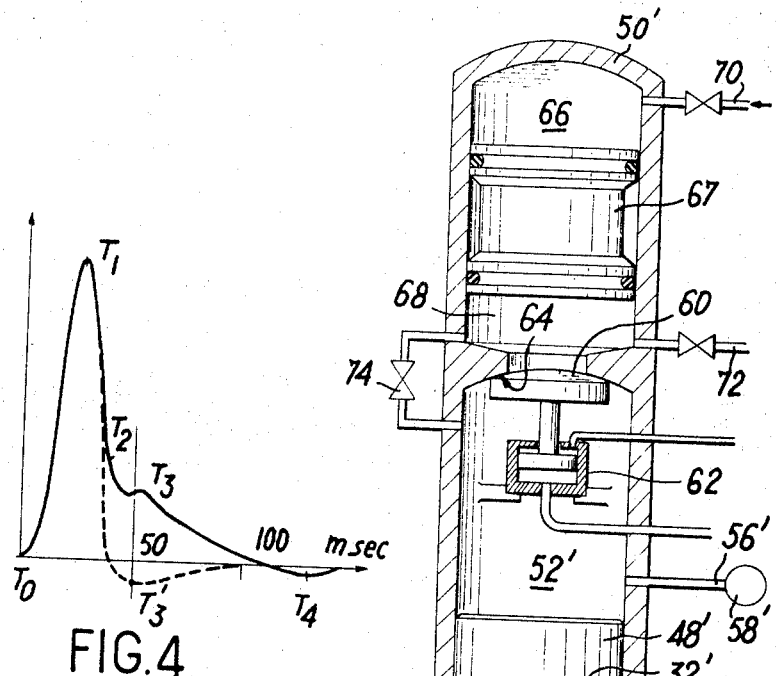
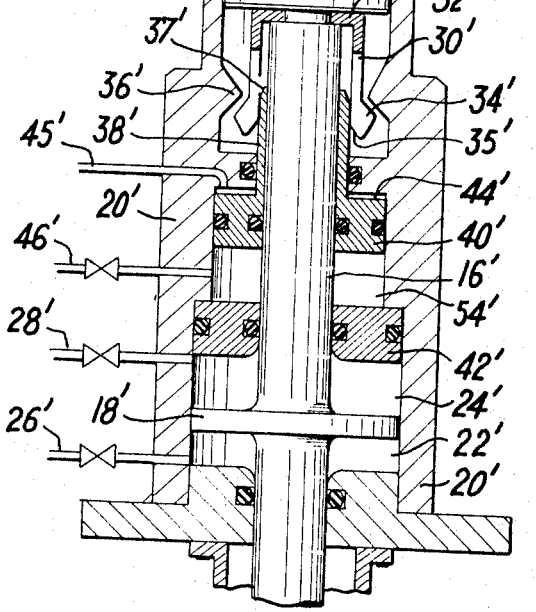

3,427,927
METHOD AND APPARATUS FOR PRODUCING HIGH-SPEED TRANSLATIONAL MOVEMENT
Jean-Jacques Beauval, Saint-Denis, Jean Duhem, Ivry-sur-Seine, and Antenore Pacchioni, Versailles, France, assignors to Commissariat à l'Energie Atomique, Paris, France
Filed Nov. 15, 1966, Ser. No. 594,603
Claims priority, application France, Nov. 17, 1965, 38,822
U.S. Cl. 91—36          26 Claims
Int. Cl. B15b *21/02, 15/26;* G60g *11/26*

ABSTRACT OF THE DISCLOSURE

The present disclosure is directed to an apparatus for moving a moveable assembly back and forth at a high speed which comprises a stationary casing, a shaft secured to a drive piston and forming a part of the moveable assembly, said piston slidably disposed within said casing and establishing two substantially pressure-type compartments, means for establishing different pressures in said compartments such that the pressure in one is higher than the pressure in the other, a mechanism for positively latching the piston in a predetermined position, said mechanism being capable of resisting the pressure force exerted on the piston, a plunger forming part of the moving assembly and having a surface which defines a drive space between it and the stationary casing, and timing means which successively deenergizes the latching mechanism for releasing the moving assembly, establishes within said drive space an over pressure which produces action in the opposite direction to said original pressure force on said piston, and relatches the moving assembly in said predetermined position. The present disclosure is also directed to a method for producing translational movement at a high repetition frequency using the above described apparatus.

---

Figure 1:
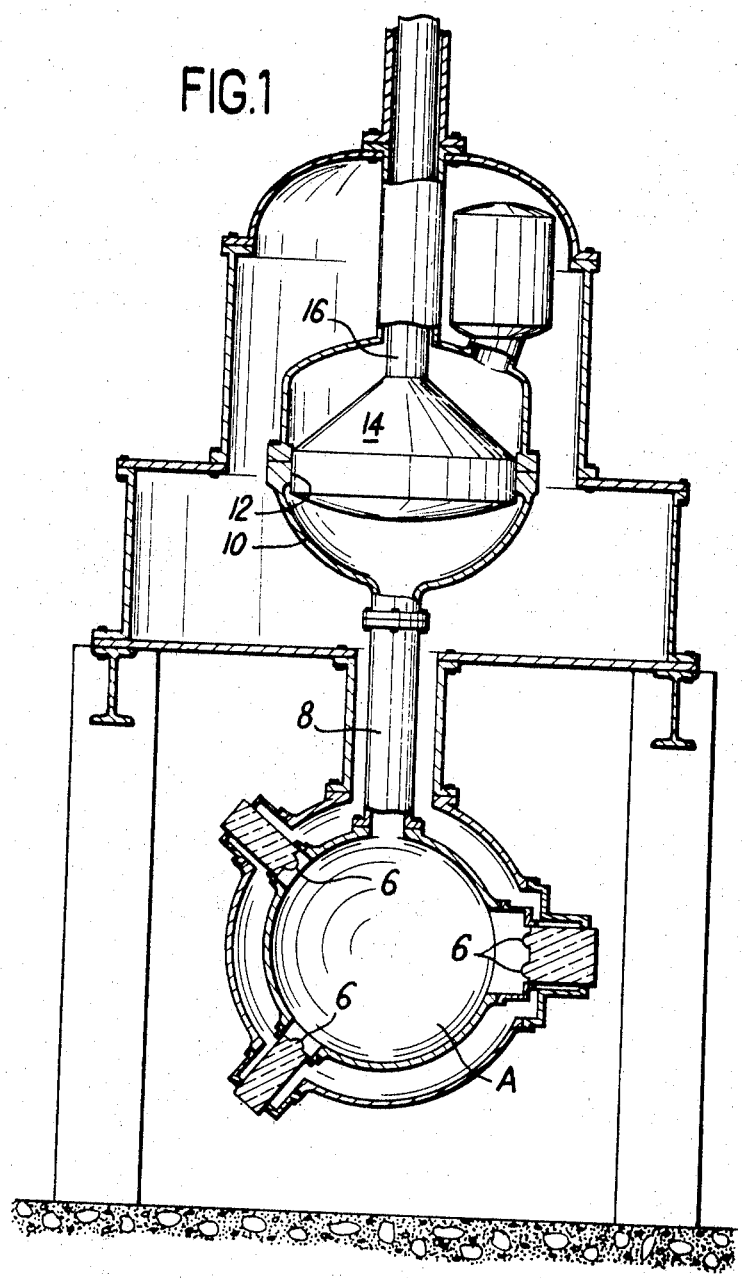

This invention is directed to a method and an apparatus for producing movements of translation at a high speed, and especially for driving the moving element of a bubble chamber of large size. More particularly, the present invention concerns a method and apparatus for controlling translational movement and at the same time reducing the energy utilized during reciprocating movement.

Bubble chambers, which rank among the most powerful instruments of fundamental research in the field of high-energy particle physics, are made up of a vessel containing a liquid, for example, liquid hydrogen, which is superheated by reducing the pressure suddenly, whereupon the movement of each particle through the liquid is indicated by a train of bubbles which can be photographed. The expansion of the liquid is usually produced by the displacement of a piston either at the top of the liquid or within a compartment which is separate from the bubble chamber proper but which is joined to the top portion of the bubble chamber by means of a row of parallel tubes, the total junction cross-section being sufficient to ensure that the pressure drop in the top compartment propagates to the bubble chamber without undue loss of pressure.

The moving element comprising the expansion piston must be subjected to an extremely rapid movement during a single expansion cycle. However, in large bubble chambers, the moving element referred to is of substantial weight. For example, the moving element of a bubble chamber can weigh about 1600 kilograms and, during a single expansion-recompression cycle, has to perform a reciprocating movement over a range of about 10 centimeters in less than about 30 milliseconds, thereby entailing an acceleration of up to about 350 $g$ and applied forces of about 400 tonnes.

Up to the present time, the expansion piston has usually been driven by establishing a pressure difference on one face of a driving piston to which said expansion piston is rigidly coupled. However, it would prove very difficult and costly to apply the power which is necessary in order to produce the repetition frequency required in the example which has just been presented or in similar examples. Furthermore, the kinetic energy acquired by the moving element would attain a value in the order of $10^5$ joules which would be difficult to dissipate. In fact, a motor having an estimated power rating of 1500 kw. would be necessary to actuate the piston at a rate of one stroke per second, which falls far short of operational requirements in the case of bubble chambers which are intended to be associated with particle accelerators presently in existence or under design.

It has also been proposed to construct a system for driving the moving element of a bubble chamber which runs with heavy liquid, such as, propane or Freon, wherein said drive system utilizes means for "latching" the moving element in the rest position by maintaining a hydraulic pressure upon a plunger which is coupled to the moving element and additionally makes use of the compressibility of the heavy liquid for the purpose of storing the expansion energy. However, this solution is practically inapplicable to bubble chambers which have a large volume inasmuch as the construction of hydraulic relief valves which operate at a high speed and have a large cross-section presents considerable difficulty. Moreover, the solution referred to is attended by a number of drawbacks chief among these being the absence of an invariable and predetermined rest position, this position being established by a liquid volume. In effect, any variation of the starting position results in a modification of the expansion cycle.

An object of the present invention is to provide an improved method and apparatus for producing movements of translation at a high speed, and especially for driving the moving element of a bubble chamber.

Another object of the present invention comprises an improved method and apparatus for controlling translational movement and at the same time reducing the energy utilized during reciprocating movement.

A further object of the present invention is to provide a means for "latching" the moving element of a large-volume bubble chamber, in the rest position.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Accordingly, the present invention is directed to a method and apparatus for controlling translational movement wherein the above-mentioned disadvantages are eliminated, especially by virtue of the fact that the energy which is utilized during each reciprocating movement is considerably lower than that which would be necessary in conventional systems, and also by virtue of the fact that the moving element is re-latched in a well-determined position.

Figure 2:
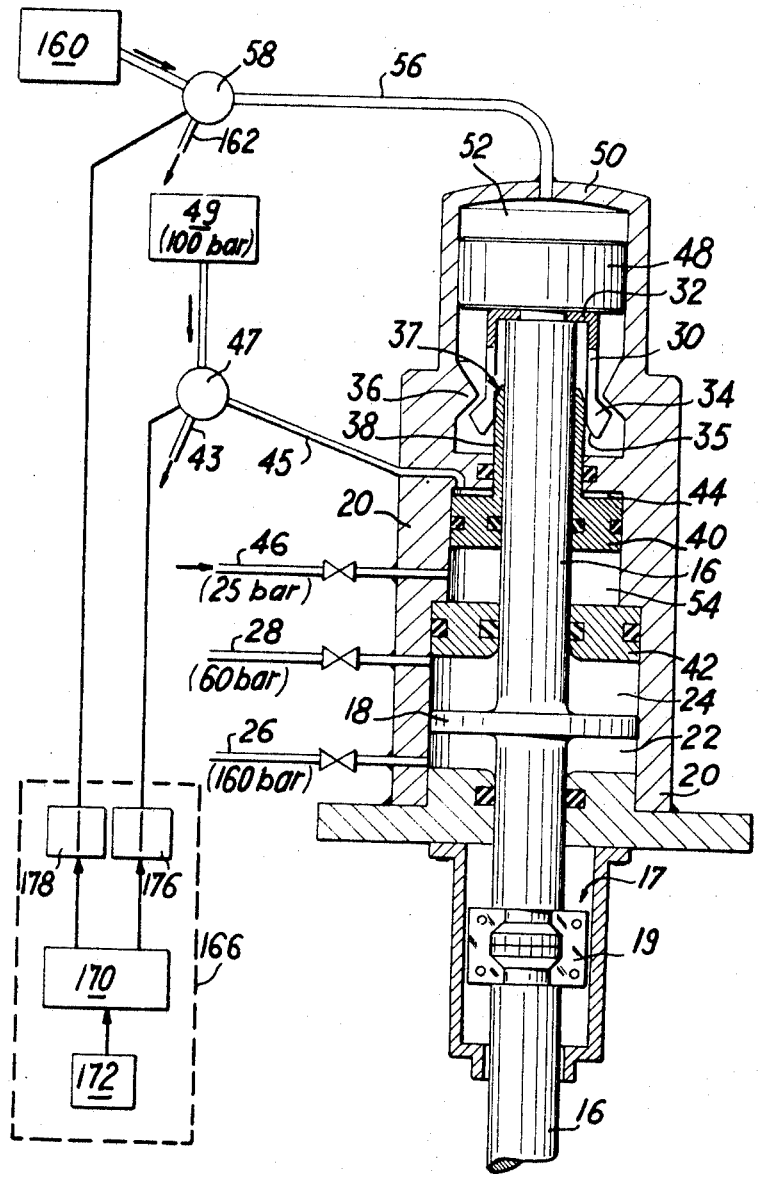

A better understanding of the present invention can be obtained from the following description which is given solely by way of example only and therefor is not to be considered as limiting. In referring to the accompanying drawings, FIGURE 1 is a diagrammatic sectional view of a bubble chamber, this view being taken along a plane which passes through the vertical axis of displacement of the expansion piston;

FIGURE 2 is a detail view showing the piston-actuating system;

FIGURE 3, which is similar to FIGURE 2, shows very diagrammatically an alternative form of the present invention;

FIGURE 4 is a curve representing the amplitudes or ranges of travel of the moving element of the drive system shown in FIGURE 3 as a function of time.

The bubble chamber which is illustrated in FIGURE 1 comprises a chamber A of generally spherical shape having a horizontal axis at right angles to the plane of the figure and provided with viewing windows 6. Said chamber is provided with extensions in the form of a series of vertical ducts 8 located in the vertical plane which passes through the axis of the cylinder, only one of said ducts being shown in FIGURE 1. The ducts 8 open into a vessel 10 having a vertical axis and comprising a cylindrical portion 12 in which an expansion piston 14 is slidably mounted. Balancing leakages exist between the cylindrical portion 12 and the piston 14 but they are of sufficiently small value not to cause undue attenuation of the pressure drop which is produced by the rapid upward motion of the piston. This arrangement makes it possible to place the vessel 10 outside the zone occupied by the deflecting coils which will be placed around the ducts 8.

The stationary assembly of the present invention is supported on a frame which is shown diagrammatically in FIGURE 1 and which is anchored in a concrete slab of sufficient thickness to afford unyielding resistance to alternating loads of about 400 metric tons as mentioned earlier.

According to the present process, the expansion piston 14 is designed to perform a reciprocating movement having an amplitude of about 10 centimeters in a time of less than about 30 milliseconds at a rate exceeding one back-and-forth movement per second. To accomplish this end, the expansion piston is associated with a drive system which is shown in FIGURE 2. This system comprises a shaft 16 secured to the expansion piston and provided with a drive piston 18 which is either added or formed in one piece with said shaft. Preferably, said drive piston has a diameter of the same order as the diameter of the expansion piston. The shaft can be advantageously designed in two sections which are coupled together by means of a joint 17 consisting of semicircular flanges 19 and fastening bolts.

A space which is defined by a stationarily fixed casing 20 formed of a number of interassembled parts is divided by the above-mentioned drive piston 18 into a lower compartment 22 and an upper compartment 24 which are essentially leak-tight. When the drive piston assumes the position shown in FIGURE 2, pressurized gas is introduced into the compartments 22 and 24 by means of pipes 26 and 28, the pressure within compartment 22 being considerably higher than in compartment 24. The pipes referred to are then closed off, their only remaining function being to readjust the pressures after long time intervals. It is possible, for example, to employ nitrogen as filling gas at a pressure of for example, about 160 bars (2320 p.s.i.) in compartment 22 and at a pressure of for example 60 bars, about (870 p.s.i.) in compartment 24.

The pressure difference within the compartments 22 and 24 exerts on the expansion piston 14 a force which tends to drive it upwards. In spite of this force, the piston is retained in a predetermined position (as shown in FIGURE 2) by a latching mechanism which comprises a set of flexible retaining-arms 30 carried by a collar 32 which is rigidly fixed in a channel of the shaft 16, said retaining-arms being provided with terminal lugs 34. The shape of said terminal lugs is such that they come into abutment with an internal annular projection 36 of the stationary wall of the casing as long as the retaining-arms 30 are not deformed.

The contact faces of the internal annular projection 36 and of the terminal lugs 34 are inclined to the horizontal so that, as a result of the force developed by the pressure difference of the gas between the compartments 22 and 24, the retaining-arms tend to bend radially inwards, thereby releasing the position. When the parts of the mechanism occupy the position shown in FIGURE 2, the above-mentioned bending movement of the retaining-arms 30 is prevented by a sleeve 38 which is interposed between the shaft and the retaining-arms (small clearances are shown in FIGURE 2 for the sake of clarity, but the parts are actually in contact).

The sleeve 38 which is provided at its base with an annular enlargement 40 is slidably mounted between the shaft 16 and the fixed casing 20 and the annular enlargement 40 of said sleeve thus defines within the casing two chambers 44 and 54 which have a variable volume. O-ring seals provide a leak-tight separation between the two chambers.

The lower chamber 54 contains a gas such as nitrogen, at a predetermined pressure of, for example, about 25 bars or 360 p.s.i., said gas being fed in through an obturable pipe 46.

The upper chamber 44 is connected by means of a pipe 45 to an electrovalve 47 which puts said chamber in communication either with a discharge pipe 43 or with a reservoir 49 containing a gas such as nitrogen at a high pressure, for example a pressure of about 100 bars (1450 p.s.i.).

The shaft 16 terminates in an annular enlarged portion constituting a plunger 48, said plunger being slidably mounted in a bell-housing 50 which closes off the casing 20, thus defining with said bell-housing a drive space 52 into which opens a pipe 56, said pipe being connected by way of an electrovalve 58 either to a reservoir 160 for pressurized gas such as nitrogen or to a discharge pipe 162.

The controlled operation of the electrovalves 58 and 47 is carried out automatically by means of an electronic synchronization device 166 of conventional type which is intended to carry out the sequence of operations involved in the practical application of the method according to the present invention. For example, the device 166 comprises a clock or time base 170 which, when it receives a drive signal from a pulse generator 72, delivers a sequence of pulses at predetermined time intervals at two outputs, alternatively. It is possible, for example, to utilize a decatron time base which delivers twelve separately variable pulses, the pulse spacing being between 0 and 1 second at intervals of $10^{-4}$ sec. The outputs of the clock are coupled to bistable devices 176 and 178 which control electrovalves 47 and 58.

The operation which is involved in the initiation of a rapid reciprocating movement of the expansion piston 14 (upward movement followed by a downward movement) will now be briefly described.

When the apparatus is set, its components occupy the positions shown in FIGURE 2. A pressure of 160 bars (2320 p.s.i.) is maintained in the compartment 22 and a pressure of 60 bars (870 p.s.i.) is maintained in the compartment 24. In this position of the piston 18, the volume of the compartment 22 is slightly smaller than the volume of the compartment 24. The sleeve 38 is maintained in the top position as a result of the pressure which prevails within the chamber 54, chamber 44 being subjected by the electrovalve 47 through discharge pipe 43 to the discharge pressure which is in the vicinity of atmospheric pressure. The sleeve 38 thus maintains the retaining-arms 30 in their latched position.

Triggering of the system is carried out by injecting compressed fluid under pressure into the chamber 44. For this purpose, the synchronization device 166 is put into operation; the generator 172 which is actuated, for example, by establishing a magnetic field in a particle accelerator, triggers the clock 170 at the instant $T_0$. At the instant $T_1$, said clock supplies to the bistable device 176 a drive pulse which causes said device to change over to its second state, thereby switching the electrovalve 47 which puts the reservoir 49 into communication with the chamber 44. The force which is exerted on the sleeve 38 as a result of the pressure within the chamber 44 is considerably higher than the force which is exerted as a result of the pressure within the chamber 54. The sleeve therefore moves downwards rapidly and releases the retaining-arms 30. Said retaining-arms then bend inwards, the terminal lugs 34 are released from the annular projection 36 and the moving element is driven upwards by the pressure which is exerted on the piston 18.

Progressively as the piston moves upwards, the pressure difference between the compartments 22 and 24 decreases and then reverses, the kinetic energy of the piston being absorbed as a result of compression of the gas contained in the chamber 24.

Throughout this first stage of operation, the synchronization device 166 has maintained the space 52 in communication with the discharge pipe 162 through the intermediary of the valve 58. At the instant $T_2$ at which the moving element has reached its top position and begins to move downwards under the action of the pressure-induced force which is exerted on the piston 18 in the direction opposite to the initial direction, a pulse derived from the clock changes the state of the bistable device 178. Thus, the synchronization device 166 produces action on the electrovalve 58 for the purpose of connecting the pipe 56 to the pressurized gas source 160. The pressure which is thus established in the drive space 52 exerts a force which is added to the force exerted on the piston 18.

The synchronization unit is programmed so that the pressure which is maintained in the space 52 is such that the work effected by the corresponding force compensates for the losses of energy during the reciprocating movement of the piston and imparts to the moving element an additional motion-pulse which enables said element to pass slightly beyond the latched position as it moves downwards.

At an instant $T_3$ such that the moving element passes beyond its latched position, a pulse derived from the clock 170 changes the state of the bistable device 176 and initiates the operation of the electrovalve 47. The synchronization unit 166 accordingly restores chamber 44 to the discharge pressure by communication with discharge line 43. The sleeve 38, on which a thrust is applied by the constant pressure within the chamber 54, will then move upwards rapidly and pass between the shaft 16 and the retaining-arms 30 so as to prevent these latter from bending inwards when the terminal lugs 32 are applied against thet annular projection 36 during the upward motion of the piston. Thus, the moving element is re-latched in the set position. Finally, at the instant $T_4$, a further pulse produced by clock 170 changes the state of the bistable device 178 and of the valve 58 which again connects the space 52 to the discharge pipe 162. The initial conditions are thus again restored.

It is apparent that a number of alternative forms of execution can be contemplated. In particular, re-latching of the moving element can be rendered automatic, connection of the chamber 44 to the reservoir 49 being limited ot the initiation of the downward motion of the sleeve 38 which then commences to return upwards under the action of the pressure within the chamber 54 as soon as the retaining-arms 30 are released. As and when the piston 14 and said retaining-arms 30 move downwards, said retaining-arms come into abutting contact with the sleeve 38 and thrust back this latter into the chamber 54 so as to permit the terminal lugs 34 to penetrate between said sleeve 38 and the casing 20.

The force exerted on the sleeve as a result of the pressure which prevails within the chamber 54 is relatively high when the sleeve has a low inertia, with the result that said sleeve is immediately restored to the top position (latched position).

In order to facilitate this movement, the top rim 37 of the sleeve 38 is tapered and the retaining-arms are thus capable of sliding over the rim 37 of the sleeve 38 so as to be outwardly displaced in the latched position.

The latching device which has just been described can also be replaced by other systems. In particular, a hydraulic clamping system can be employed. The term "hydraulic clamping" designates a system for locking a shaft consisting of a fixed casing which is slightly extensible and which is normally clamped around the shaft. The introduction of oil under high pressure into a system of grooves machined in the bore of the casing produces a slight expansion of said casing and lubrication which result in unlocking of the shaft. However, in order to lock the moving element in any predetermined position, the locking device referred to must be controlled with a very high degree of precision.

The form of construction which is illustrated in FIGURE 2 gives desirable results. However, care should be taken in controlling the synchronization since slight errors can cause percussions which may eventually cause damage to the retaining-arms 30. In large bubble chambers it is desirable to attain operating times in the order of one million back-and-forth movements without any danger of failure and without any manual operation or adjustment of the latching mechanism. In such a case, it is advantageous to make use of the variant which is illustrated in FIGURE 3 which eliminates shocks or at least attenuates shocks to a very substantial extent.

For the sake of greater simplicity, the components of FIGURE 3 which are identical with those of FIGURE 2 or which have a counterpart in this figure are designated by the same reference numeral with the addition of a prime index, and no synchronization has been illustrated.

The entire bottom portion up to and including the plunger 18' of the system of FIGURE 3 is identical with the system of FIGURE 2, but the drive space 52' in this instance is delimited by a seating 64 formed in the bell-housing 50' which terminates the casing. Said seating is adapted to cooperate with a valve 60 which can either be applied against or withdrawn from its seat with a controllable force by means of a hydraulic jack 62. The drive space 52' may be connected to a source of hydraulic fluid under pressure or put to discharge via pipe 56' provided with a three-way valve 58'. The interior of the bell-housing 50' above the valve-seat 64 is separated by a free piston 67 into an upper pneumatic compartment 66 and a lower hydraulic compartment 68 constituting an energy accumulator which serves to prevent cavitation of the hydraulic fluid within the drive space 52' during the downward movement of plunger 48'. When the valve 60 is open, the seat limits a communication aperture of large cross-sectional area between the drive space 52' and the lower hydraulic compartment 68.

The compartments 66 and 68 may respectively be connected by way of a pipe 70 having a closure valve to a source of gas at a moderate pressure, for example, about 10 bars or 145 p.s.i., and by way of a pipe 72 having a closure valve to a supply of hydraulic fluid under pressure.

Finally, a connecting pipe fitted with a valve 74 serves to put the drive space 52' into communication with the lower compartment 68.

The operation of the device of FIGURE 3 which is shown diagrammatically in FIGURE 4 is as follows:

Initially, the latching mechanism holds the retaining-arms 30' in position and maintains the moving element against the pneumatic force which is exerted on the piston 18'. The valve 74 and the valves of pipes 70 and 72 are closed. A pneumatic pressure of about 10 bars (145 p.s.i.)

prevails within the compartment 66. The valve 60 is maintained in the open position by a hydraulic pressure within the cylinder 62 for the purpose of balancing the pressure differential between the compartment 68 and the space 52'. The downward motion of the sleeve 38' is then initiated (instant $T_0$) by the synchronization mechanism (not shown) as in FIGURE 2, whereupon as soon as the moving element is released, it is driven upwards as a result of the difference in pressures within the chambers 24' and 22', reaches its top position at the instant $T_1$ (as shown in FIGURE 4) and rebounds under the pneumatic spring effect produced by the reversal of pressures within the compartments 22' and 24' and initiates a downward travel. During the upward movement, hydraulic fluid flows from space 52' to compartment 68 and forces piston 67 upward. During this downward motion of the moveable element, the piston 67 moves down and prevents, the appearance of negative pressures within the compartment 52'. When the downwardly moving element terminates its downward rebound movement and comes close to its lowermost position (point $T_2$ in FIGURE 4), the synchronization means energizes jack 62 which lifts the valve 60 with a force just sufficient to overcome a pressure differential of 2 to 3 bars (29 to 43 p.s.i.) between compartment 68 and drive space 52'. Thus, the valve makes it possible for the hydraulic fluid, for example oil to flow down from the compartment 68 towards the space 52' but closes almost immediately as soon as the direction of hydraulic fluid transfer tends to reverse (point $T_3$) and prevents the upward motion of the plunger 48'.

As a result of the closure of the valve 60, the moving element is retained hydraulically in a position which is slightly above the design mechanical latching position (see FIGURE 4) in view of the fact that there have been losses and no addition of energy from the time of triggering of the system. The valve 58' which is provided in the pipe 56' (and the passageway of which must be of large section) is fully opened for a short time producing an additional downward motion-pulse of the moving element up to a point located slightly beyond its latched position (portions $T_3$, $T_4$ of the curve shown in FIGURE 4) and closed again. The piston can then be latched mechanically by initiating the upward motion of the sleeve 40' while the piston is still under its final latching position. Finally, the valve 74 is opened by the synchronization means for balancing the pressures within the space 52' and the compartment 68 and closed again. An amount of hydraulic fluid corresponding to that sent to discharge through valve 58' is added by the temporary opening of the valve on pipe 72. Finally, the valve 60 is opened and kept open by the synchronizing means. It should be noted that, although the valve 60 closes off a passage which has a large diameter, said valve only requires a low actuating force inasmuch as it is actuated only when the back-pressures applied thereto are of a low order.

The repetition rate which is made possible by this form of construction is slightly lower than the rate obtainable by means of the system of FIGURE 2. However, it should be noted that the total time-duration of the reciprocating movement including the re-latching operation can easily be reduced to about 150 milliseconds.

Among the possible variants of the system, the following may be noted: The space 66, instead of being supplied with gas at constant pressure, can be connected to a three-way valve which permits a supply of energy similarly to that which is provided in the chamber 52 of FIGURE 2, wherein the piston 48 can be returned below its mechanical latching position without injection of liquid under pressure into the chamber 52'. Accordingly, the hydraulic latching operation takes place in an indeterminate position, but it is wholly apparent that other variants may be contemplated.

It is apparent that the reciprocating apparatus of the present invention can be used in any system requiring translational movements at a high speed, such as for example, bubble chambers of large size.

It is claimed:
1. An apparatus for moving a movable assembly back and forth at high speed which comprises a stationary casing, a shaft secured to a drive piston and forming a part of the movable assembly, said piston slidably disposed within said casing and establishing two substantially pressure-tight compartments, means for establishing different pressures in said compartments such that the pressure in one is higher than the pressure in the other, a mechanism for positively latching the piston in a predetermined position, said mechanism being capable of resisting the pressure force exerted on the piston, a plunger forming part of the moving assembly and having a surface which defines a drive space between it and the stationary casing, and timing means controlling said latching mechanism to successively de-energize the latching mechanism for releasing the moving assembly, establish within said drive space an over pressure which produces action in the opposite direction to said original pressure force on said piston, and re-latch the moving assembly in said predetermined position.

2. The apparatus of claim 1, wherein the shaft of said drive piston extends from said stationary casing and is provided with an expansion piston which is slidably mounted and disposed within a vessel which communicates with a bubble chamber.

3. The apparatus of claim 1, wherein the latching mechanism comprises flexible retaining-arms carried by a collar which is rigidly fixed in a channel of said shaft, said arms provided with terminal lugs having a shape such that they come into abutment with an internal annular projection of the wall of the stationary casing, when the retaining-arms are not deformed, and when the piston is in a latched position.

4. The apparatus of claim 3, wherein a sleeve is interposed between the shaft and the retaining-arms to prevent the retaining-arms from bending, thus maintaining the drive piston in its latched position.

5. The apparatus of claim 4, wherein the sleeve is provided at its base with an annular enlargement slidably mounted between the shaft and the stationary casing.

6. The apparatus of claim 5, wherein the annular enlargement defines within the stationary casing two chambers having a variable volume.

7. The apparatus of claim 1, wherein the latching mechanism is a hydraulic clamping system.

8. An apparatus for moving a movable assembly back and forth at high speed which comprises a stationary casing, a shaft secured to a drive piston and forming a part of the movable assembly, said piston slidably disposed within said casing and establshing two substantially pressure-tight compartments, means for establishing different pressures in said compartments such that the pressure in one is higher than the pressure in the other, a mechanism for positively latching the piston in a predetermined position, said mechanism being capable of resisting the pressure force exerted on the piston, a plunger forming part of the moving assembly and having a surface which defines a drive space between it and the stationary casing, said drive space being divided into an upper and lower section by a valve seating, a valve means adapted to cooperate with said valve seating, and means including timing means which successively de-energizes the latching mechanism for releasing the moving assembly, establishes within said drive space, by hydraulic means, an over pressure which produces action in the opposite direction to said original pressure force on said drive piston, and re-latches the moving assembly in said predetermined position.

9. The apparatus of claim 8, wherein hydraulic means are used to open and close the valve means.

10. The apparatus of claim 8, wherein pipe means communicate with the lower section of the drive space to provide for the introduction of hydraulic fluid under pressure.

11. The apparatus of claim 8, wherein a free piston is slidably disposed in the upper section of the drive space, said piston dividing the upper section into an upper and lower compartment.

12. The apparatus of claim 8, wherein the shaft of said drive piston extends from said stationary casing and is provided with an expansion piston which is slidably mounted and disposed within a vessel which communicates with a bubble chamber.

13. The apparatus of claim 8, wherein the latching mechanism comprises flexible retaining-arms carried by a collar which is rigidly fixed in a channel of said shaft, said arms provided with terminal lugs having a shape such that they come into abutment with an internal annular projection of the wall of the stationary casing, when the retaining-arms are not deformed, and when the piston is in a latched position.

14. The apparatus of claim 13, wherein a sleeve is interposed between the shaft and the retaining-arms to prevent the retaining-arms from bending, thus maintaining the drive piston in its latched position.

15. The apparatus of claim 14, wherein the sleeve is provided at its base with an annular enlargement slidably mounted between the shaft and the stationary casing.

16. The apparatus of claim 15, wherein the annular enlargement defines within the stationary casing, two chambers having a variable volume.

17. The apparatus of claim 8, wherein the latching mechanism is a hydraulic clamping system.

18. A method for producing translational movements at a high repetition frequency which comprises, establishing a high pneumatic pressure difference between two pressure-tight compartments separated by a drive piston, said drive piston being mechanically latched in a predetermined position, releasing said piston so as to drive the piston as a result of said pressure difference, stopping the piston thereby reversing the pressure difference between the two pressure-tight compartments, and mechanically latching the piston in said predetermined position when said piston has returned to said position or beyond said position.

19. The method of claim 18, wherein an additional motion-pulse assists in returning said piston to the predetermined position.

20. The method of claim 19, wherein said additional motion-pulse is imparted to the piston by establishing a pneumatic pressure upon a plunger which is coupled to said piston.

21. The method of claim 18, wherein the latching of the piston is effected automatically.

22. The method of claim 18, wherein the high frequency translational movements are translated to an expansion piston disposed within a vessel which is in communication with a bubble chamber.

23. The method of claim 22, wherein the reciprocating movement of the expansion piston has an amplitude of about 10 centimeters in a time of less than about 30 milliseconds at a rate exceeding one back-and-forth movement per second.

24. A method for producing translational movements at a high repetition frequency which comprises introducing pressurized gas into two pressure-tight compartments separated by a drive piston, the pressure in one compartment being considerably higher than the pressure in the other compartment, releasing a latch mechanism, causing said drive piston to move as a result of said pressure difference, stopping said piston as a result of the pressure build-up in the compartment of lower pressure, due to compression, thereby reversing the pressure difference between the two pressure-tight compartments, returning the piston to its original position by the use of an addition motion-pulse imparted to the piston by establishing a pneumatic pressure upon a plunger which is coupled to said piston, and mechanically latching the piston in said predetermined position when said piston has returned to said position or beyond said position, said releasing of the latching mechanism, imparting pressure to the plunger and re-latching of the piston being successively timed to provide the desired frequency.

25. The method of claim 24, wherein the latching of the piston is effected automatically.

26. The method of claim 24, wherein the high frequency translational movements are translated to an expansion piston disposed within a vessel which is in communication with a bubble chamber.

References Cited

UNITED STATES PATENTS

| | | | |
|---|---|---|---|
| 1,036,340 | 8/1912 | Rockwell et al. | 267—65 |
| 1,064,214 | 6/1913 | Herman | 267—65 |
| 2,130,618 | 9/1938 | Gnavi | 91—44 |
| 3,315,568 | 4/1967 | Fredd | 91—44 |

CARROLL B. DORITY, JR., *Primary Examiner.*

U.S. Cl. X.R.

91—44, 55; 92—16, 27, 28; 267—64; 73—36